(12) United States Patent
Buckingham et al.

(10) Patent No.: US 7,543,518 B2
(45) Date of Patent: Jun. 9, 2009

(54) LINK ASSEMBLY FOR A SNAKE LIKE ROBOT ARM

(75) Inventors: Robert Oliver Buckingham, Bristol (GB); Andrew Crispin Graham, Bristol (GB)

(73) Assignee: Oliver Crispin Robotics Limited (GB)

( * ) Notice: Subject to any disclaimer, the term of this patent is extended or adjusted under 35 U.S.C. 154(b) by 0 days.

(21) Appl. No.: 10/736,354

(22) Filed: Dec. 15, 2003

(65) Prior Publication Data

US 2004/0195988 A1    Oct. 7, 2004

Related U.S. Application Data

(63) Continuation of application No. PCT/GB02/02649, filed on Jun. 12, 2002.

(30) Foreign Application Priority Data

Jun. 13, 2001  (GB)  ................... 0114406.2

(51) Int. Cl.
*B25J 17/02*  (2006.01)
(52) U.S. Cl. .................. 74/490.05; 74/490.04; 901/21; 901/28
(58) Field of Classification Search .............. 74/490.04, 74/490.05, 469, 479, 490.01; 901/21, 28, 901/29, 15; 414/5, 7; 403/24, 122, 135; 267/141.1, 141.3, 141.7; 464/94, 96
See application file for complete search history.

(56) References Cited

U.S. PATENT DOCUMENTS

| | | | | | |
|---|---|---|---|---|---|
| 2,761,297 | A | * | 9/1956 | Buchsteiner | .................. 464/53 |
| 3,266,059 | A | * | 8/1966 | Stelle | ........................... 623/62 |
| 3,274,850 | A | * | 9/1966 | Tascio | ....................... 74/502.3 |
| 3,275,850 | A | * | 9/1966 | Arseneau | .................... 327/392 |
| 3,504,902 | A | * | 4/1970 | Irwin | ........................ 267/152 |
| 4,393,728 | A | * | 7/1983 | Larson et al. | .................. 74/469 |
| 4,494,417 | A | * | 1/1985 | Larson et al. | .................. 74/469 |
| 4,534,239 | A | * | 8/1985 | Heimann | .................... 74/502.4 |
| 4,751,821 | A | * | 6/1988 | Birchard | ....................... 60/698 |
| 4,784,042 | A | * | 11/1988 | Paynter | ....................... 91/534 |
| 4,815,911 | A | * | 3/1989 | Bengtsson et al. | ............. 414/7 |
| 4,977,790 | A | * | 12/1990 | Nishi et al. | .............. 74/490.04 |
| 5,297,874 | A | * | 3/1994 | Raines | ........................ 384/221 |
| 5,902,050 | A | * | 5/1999 | Balczun et al. | ............. 384/206 |
| 6,170,990 | B1 | * | 1/2001 | Hawkins | ..................... 384/297 |

* cited by examiner

*Primary Examiner*—Richard W L Ridley
*Assistant Examiner*—James Pilkington
(74) *Attorney, Agent, or Firm*—St. Onge Steward Johnston & Reens LLC

(57) ABSTRACT

The present invention relates to a link assembly for a robot arm which comprises first and second link members each adapted for limited movement one with respect to the other and resilient elastomeric material disposed between said first and second members and bonded or keyed thereto whereby movement between the first and second member results in shear movement within the elastomeric material disposed there between.

36 Claims, 7 Drawing Sheets

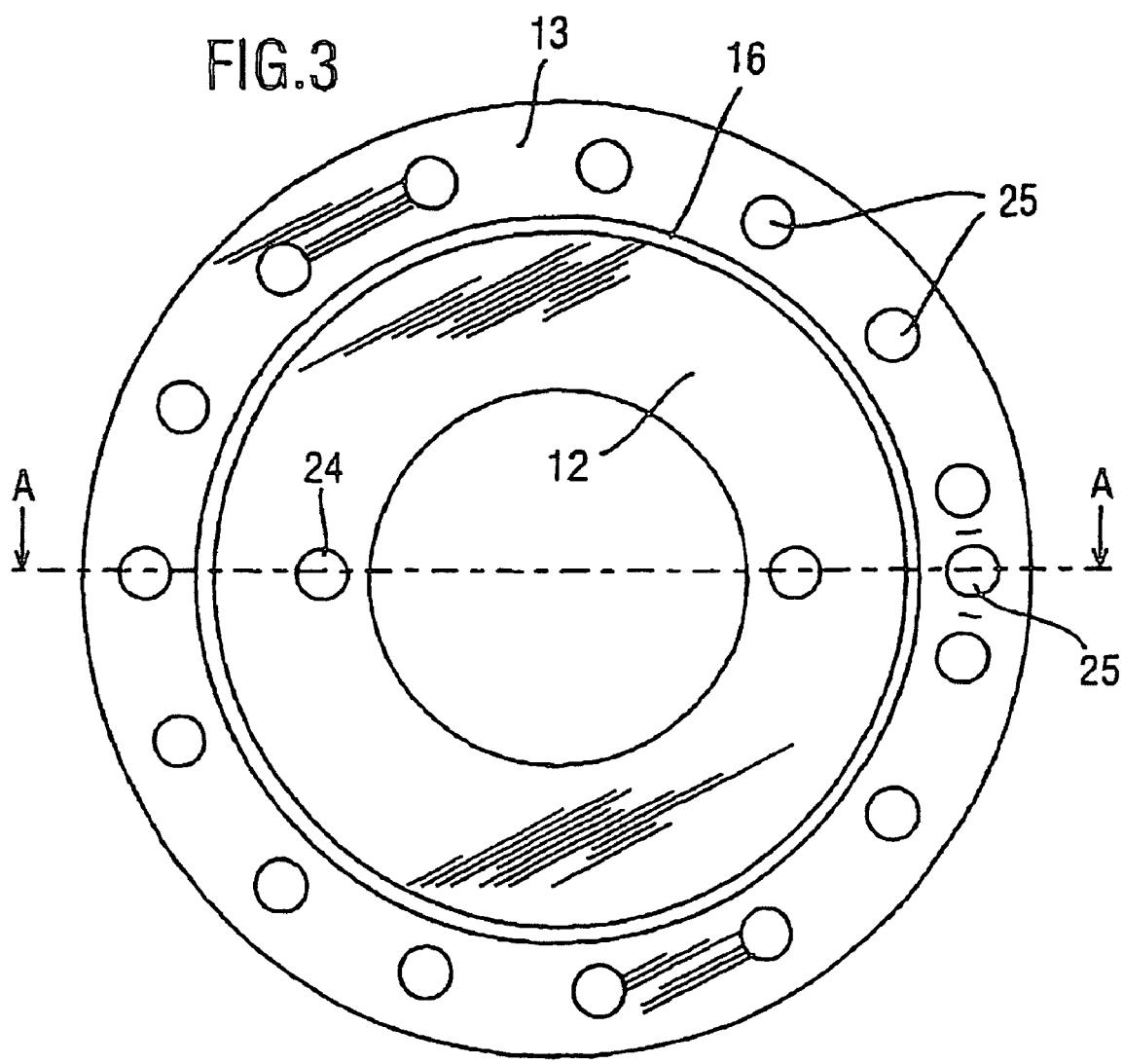
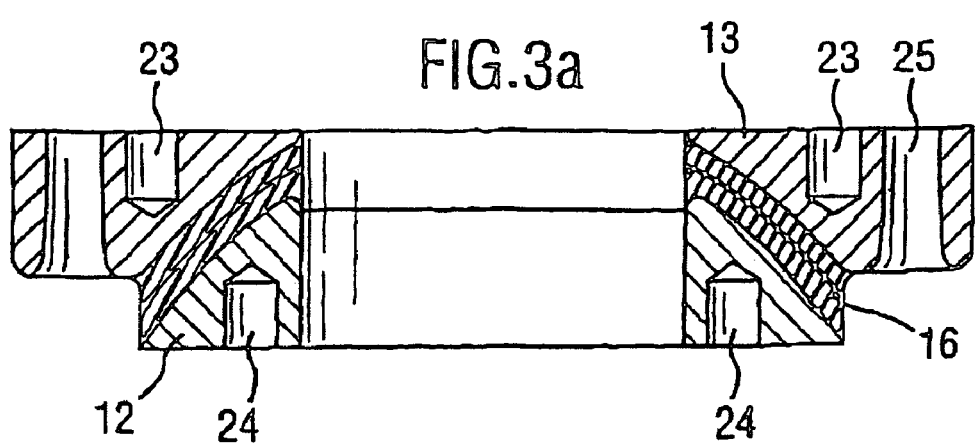

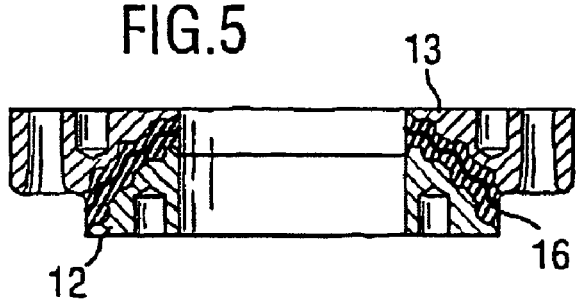
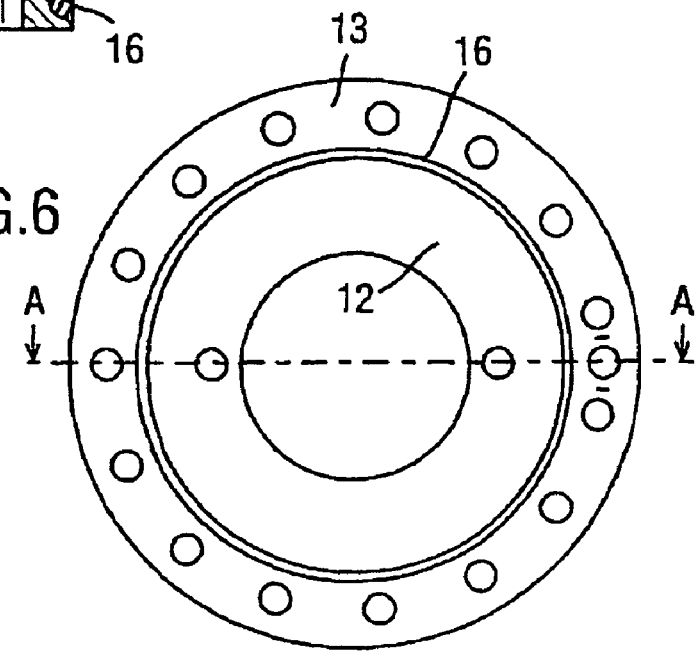
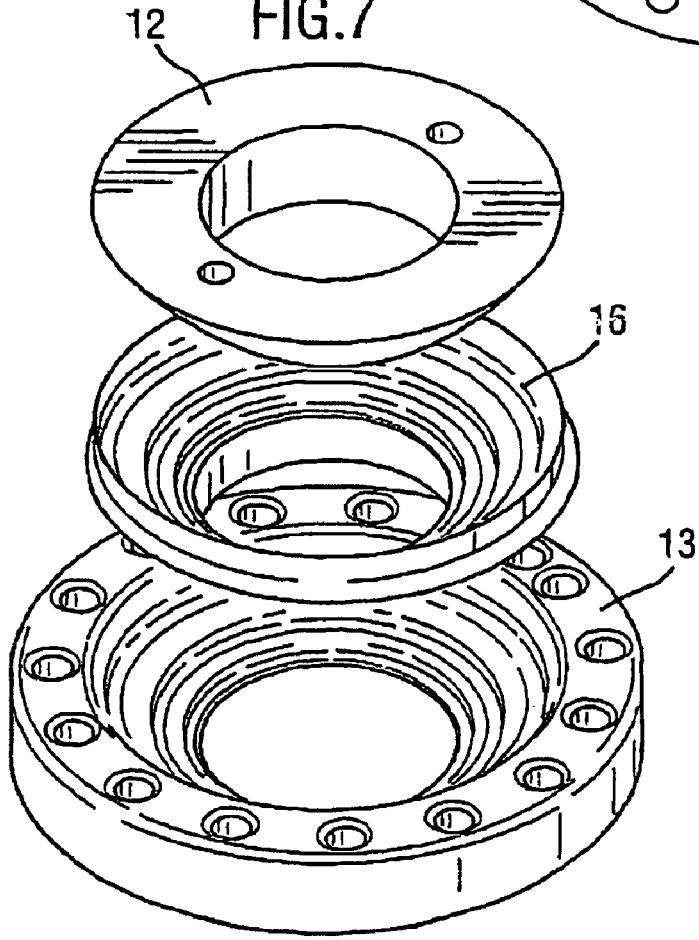

LINK ASSEMBLY FOR A SNAKE LIKE ROBOT ARM

This application is a continuation of pending International Patent Application No. PCT/GB02/02649 filed Jun. 12, 2002 which designates the United States and claims priority of pending British Application No. 0114406.2 filed Jun. 13, 2001.

This invention relates to an improvement in the robotic positioning of work tools and sensors within a work environment, and has particular reference to improved mechanical and software tools for positioning a work tool or sensor.

BACKGROUND OF THE INVENTION.

Traditionally, mechanical equipment such as engines and machines incorporating a housing has been maintained by regular maintenance schedules. In the event of a malfunction, an operative or engineer will run the machine or engine through a series of test Functions in a trouble-shooting programme and take note of the reaction of the machine or engine to each test function from an observation of the action or reaction of the machine to a given test function, it is possible to diagnose at least in part, the general area of malfunction of the machine. Thereafter, the machine is dismantled to an extent sufficient to enable the possible malfunction to be identified and a repair effected.

Our co-pending British Patent Application No 0020461.0, the disclosure of which is incorporated herein by reference, describes and claims apparatus comprising a work head adapted to carry a tool or examination element for work or examination at a site internally of a machine, which apparatus comprises a support arm for a work head, said arm being adapted to enter within said machine to position the work head in the desired operating position, operating means for operational control of said work head and control means for controlling the attitude and positioning of the arm within said machine wherein the support arm comprises at least one segment having a plurality of links, each link being articulated with respect to its neighbour and means for controlling the position and/or attitude of said segment relative to a datum thereby enabling the arm to follow and adapt to a predetermined path within the machine from entry in the machine housing to the work site.

In a particular aspect of the invention described in that application, each segment comprises a plurality of links, there being a degree of articulation between adjacent links. By maintaining articulation of the links in each segment under tension, the spatial positioning of each segment can be controlled with precision to enable the arm to follow a convoluted path to guide the work tool into the machine. An arm of this type is sometimes referred to as a "snake", "snakey" or serpentine arm because of its ability to extend axially of itself in the manner of a snake and to flow around obstacles in order to follow a convoluted path.

The invention described in British Patent Application No 0020461.0 requires precision engineering of each component to minimise frictional losses at the point of articulation between each pair of links. In a multi-link segment, these friction losses build up and in a multiple segment robotic arm; the overall friction losses to be overcome during manipulation of the arm can be considerable. There is a need, therefore, for a device in which the manufacture of the components is relatively straightforward and in which the friction losses can be reduced. In the device specifically described in British Patent Application No 0020461.0, spring means may be provided to bias each of the links against the compressive tension force being exerted by the control cables.

The present applicants have found that by dispensing with the springs and interposing instead a layer of rubber or elastomeric material either bonded or keyed to the two members constituting the articulation between adjacent links within a segment, the rubber can constitute a fixed frictional contact surface between the articulated components while at the same time providing the resilient shear capacity necessary to produce "stiffness" of the joint.

SUMMARY OF THE INVENTION.

According to one aspect of the present invention, therefore, there is provided a link assembly for a robot arm or snake arm, which comprises:—

First and second link members each adapted for limited movement one with respect to the other, said first link member having a first set opening extending therethrough said bore;

and elastomer means disposed between said first and second members and bonded or keyed thereto the arrangement being such that movement between said first and second members results in shear movement within the elastomer means disposed between them.

The elastomer may be of a natural or synthetic rubber or any other suitable resilient or elastomeric material. The elastomer is preferably disposed as a layer between said first and second link members. In one embodiment of the present invention, the first and second members may be configured in a co-operating mating relationship and the elastomer means may be disposed between them as a thin layer whereby a bending movement between the members produces shear movement within the elastomer means and reduces any compressive movement as a result of the relative movement between said first and said second members to a minimum. The elastomer may serve to produce axial stiffness and bending flexibility of the joint between the members.

It is preferred that the thinkness of the layer is as thin as possible and layer of 3 mm or less have been found to be advantageous. The layer may be bonded to one or both of the members or may be keyed to one or both. Each surface contiguous a member is preferably secured in operation so that relative movement between the members produces a shear movement within the elastomer. The thinness of the layer will reduce the tendency toward compression and will hence provide improved stability of the positioning of the component and will enhance the axial stiffness of each link articulation in the segment.

The elastomer means may comprise a plurality of layers of elastomer in which a rigid layer bonded or keyed to adjacent elastomer layers may serve to separate each elastomer layer from its neighbour. The elastomer means may be a laminate and the interleaving or rigid layer between each layer of elastomer may be any rigid layer or material, which is bondable to or capable of being keyed to the elastomer. The interleaving layer should be stiff enough to reduce compressive movement of the elastomer to a minimum. Typical materials for the interleaving layer may be a thin metal layer, resin or glass fibre or may be a mat of either woven or unwoven carbon fibre or Kevlar.

The invention further includes a robotic arm containing at least one segment comprising a plurality of links in accordance with the invention, and control means for controlling the movement of said links within the segment wherein the control means maintains the said links under tension or compression. The control means may be at least one wire extending from one end of the segment to the other.

In a preferred aspect of the present invention, the control means may comprises three wires each extending from one end of the segment to the other, whereby changing the tension in the wires one relative to the other, causes or allows the links to flex thereby controlling the movement of the segment. The wires are preferably tensioned to maintain the links under compression. The application of differential tension between the wires causes or allows the segment to move or bend.

In a particular embodiment of the invention each link may be formed of three components, an outer disk, which preferably has holes for the control wires so that the control wires preferably extended externally of the other components of the link.

an inner disk which is adapted to be disposed generally inwardly of the outer disk and which has a central bore to accommodate control and/or power means for the work head, and an elastomer disk or layer extending between each inner and outer disk which is bonded or keyed to each but which is otherwise free-floating between said inner disk and outer disk so that the inner disc is not constrained by other components of the assembly.

A robotic arm may comprise a plurality of segments in accordance with the invention in which each segment is provided with control means therefor. At least one of the members of each link may be provided with means for guiding the wires from one end of the segment to the other. The wires may be disposed externally of the segment links. Each wire may terminate in a ferrule, which is adapted to engage with a corresponding recess in the end cap of a segment so that on tensioning the wires, the ferrule is brought into engagement with the end cap to exert a compressive load an each of the segments to maintain the stiffness of the links in the segment.

Each control wire may be operated by an actuator: where there are control wires for a plurality of segments, said actuators are spaced in one or more arcs about an actuator board or head board contiguous one end of the first segment. Typically the actuator array may provide one actuator for each wire and they may be disposed in a spaced arcuate relationship to define a frustocone. The wire from each actuator may be passed about a guide such as a pulley to provide a fair lead for the control wire.

In an alternative aspect of the present invention, at least some of the actuators may be located within the segment assembly in which case, means for the activation of the actuators will be necessary. Such means may include data connecting cables or wireless data transmission means of a type generally known in the art. In the latter case, it will be necessary to take account of the environment of use in order to determine the optimum means of control.

A segment can be built progressively from a series of links or the complete segment may be assembled in a template with the elastomer being injected into the Interstices between the components as in the form of a mould tool. In this way, it is possible to produce bonded complete segments relatively easily and quickly.

In an alternative embodiment of the present invention, each link may be produced as pairs of half-links, which may then be assembled back to back. In this way, an inner link and an outer link half may be assembled with its bonding rubber layer. The link halves may then be assembled back-to-back or front-to-front to form the unitary link components, a plurality of which together form the segment.

The present applicants have found that it is possible to produce each half-link component in three separate individual components, namely an outer link, an inner link portion and the rubber bearing. All that is required is that the bearing should be keyed to each of the link components so that on attempting to move one component relative to the other, shear movement or force is generated within the rubber component. The various half-linked components can then be "pinned" together by means of locating dowel pins provided in mating holes on each of the components. The assembly can be produced "loose" and the cables can be threaded through the various operating holes in the outer link periphery coupled to the actuator or headboard. Alternatively, the components may be fixedly secured together as by gluing. Once the actuators react to produce a degree of tension in the board, the whole assembly is held together so that by varying the tension in the wires, the segment can be caused to bend as appropriate. The first and second members constituting the components of each link, or part link, may define for its intermediate rubber component, either a spherical or conical shell or something in-between spherical or conical or perhaps even toroidal. If the component is spherical, then as the inner disc is rotated in relation to the outer disc, all the deformation of the spherical component is carried out through shear. If the component design is changed so that it is no longer spherical, any rotation of one part in relation to the other causes the bulk modulus of the elastomer to be exercised, that is to say as well as shearing the component; there is a resultant generation of local tension and compression parallel to the link axis. This makes any non-spherical joints stiffer than a spherical joint of generally equivalent basic dimension.

As has been indicated above, there is a significant advantage in replacing the rubber part of each link with multiple layering in order to introduce two more, thinner pieces of metal. This enables such a link to have a greater range of motion more effectively than simply doubling the number of links per segment. The length added to a link to increase the flex angle by a factor of 2 is less than double the original link spacing. This idea can be extended within reasonable limits. The thin rigid shell between the two rubber layers serves to constrain the rubber parts such that the two rubber parts provide about the same shear stiffness as a single rubber part of double the thickness, but the two rubber parts of lesser thickness are stiffer in compression than a single part of double the thickness.

In this particular embodiment, if two adjacent links are flexed so that the outer peripheries are brought together, the diametrically opposite positons move apart and thus serve to define the segment of an annulus. In these circumstances, the inner discs are free to move in relation to the outer discs. The object of the design is to maintain the centre of rotation of the components stationary and at a position at the centre of the spherical surface of the inner disc in the undeformed position. In essence this works like a ball and socket joint with no friction other than hysteresis losses within the rubber and a small amount of axial compression in order to maintain stiffness of the joint.

By using elastomeric discs or bearings between each of the moving parts of each link, there is a significant reduction in friction and at the same time, the device becomes extremely easy to manufacture in bulk. Once tools and templates have been produced, the reproduction of large numbers becomes relatively easy. Segments made up of a significant number of links can be produced and the optimum control for each segment is 3 wires. While it is possible to dispense with perhaps one of the wires in a segment or at least one of the operating wires in a segment, it is preferred to use at least 3 control wires in order to obtain optimum manipulation of the segment. For a multi-segment arm, three sets of control wires will be required for each, thus an eight segment arm will require 24 control wires in all, with a separate actuator control for each.

In a further aspect of the present invention an external sleeve may be provided about each segment and in a particular embodiment of the invention, this sleeve may be a bellows-type sheath. The use of such a sheath has a number of advantages in that it increases the torsional/bending stiffness of the links. This is particularly beneficial since it is possible using the appropriate construction of bellows sheath to increase the tortional stiffness of the arm with very little increase in bending stiffness.

An additional benefit of the sheath is to protect the wires and other components from external causes of damage and enables the complete segment to be filled with a lubricant. Typical lubricants may be either dry powder or a liquid such as grease and/or oil. The physical characteristics of the lubricant incorporated in the arm may be selected according to the environment in which the arm is to operate. A particular feature of this embodiment of the present invention is that as the arm flexes, the geometrical shape of the interstices between adjacent links changes and this has the effect of displacing or "pumping" lubricant from one area of the segment to another and ensures a positive lubrication of the components due to the circulation of the lubricant within each segment. In another aspect of this particular feature of the invention, the arm may be provided with a lubricant reservoir and lubricant may be pumped continuously through the arm and recycled back to the reservoir. This embodiment is particularly useful where the arm is to be used in an aggressive environment and where cooling of the arm is required. In this case cooling means may be incorporated with the lubricant reservoir.

By using apparatus in accordance with the present invention, it is possible to create paths by using a joystick control assembly for tip guidance, or in the alternative, off-line or on-line techniques can be provided for computer control through a CAD model of the proposed environment.

BRIEF DESCRIPTION OF THE DRAWINGS.

Following is a description with reference to the accompanying drawings of embodiments of the device in accordance with the present invention.

In the drawings:—

FIG. 3 is an end view of a link element or a half link element of FIGS. 1 and 2; and FIG. 3A is a cross-section on the line A-A of FIG. 3.

FIG. 5 is a cross-section on the line A-A of FIG. 6.

FIG. 6 is an end view of an alternative embodiment of the present invention.

FIG. 7 is an exploded diagram of an "half" link of the embodiment of FIGS. 5 and 6.

DETAILED DESCRIPTION OF THE INVENTION.

An arm in accordance with the present invention comprises a plurality of segments indicated generally at 10 arranged end-to-end to form an extended "snake" arm. Each segment comprises a plurality of link components indicated generally at 11. Each link component comprises an inner disc 12 and an outer disc and wire guide 13. The inner disc 12 is shaped to provide an arcuate annular surface indicated generally at 14 and the outer disc 13 has a matching arcuate surface 15.

Figure 1:
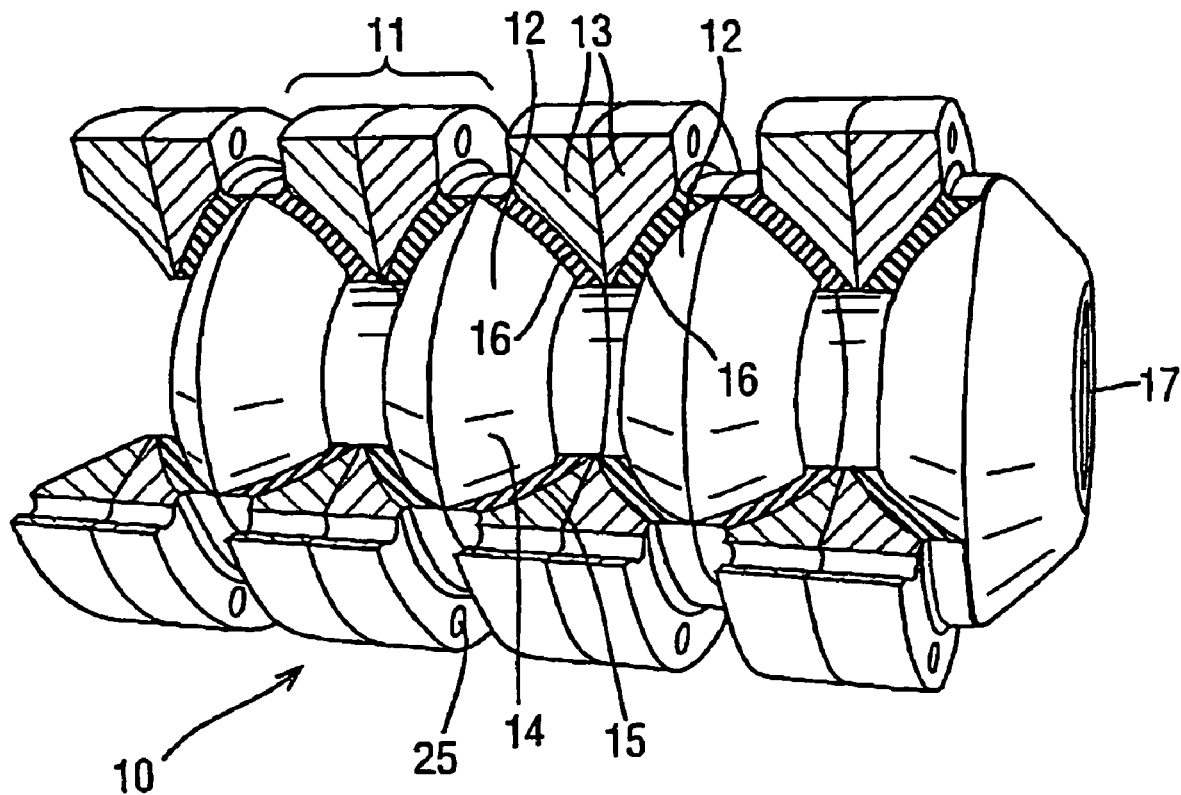
FIG. 1 is a perspective view of a plurality of links in a segment in accordance with the present invention.
Figure 2:
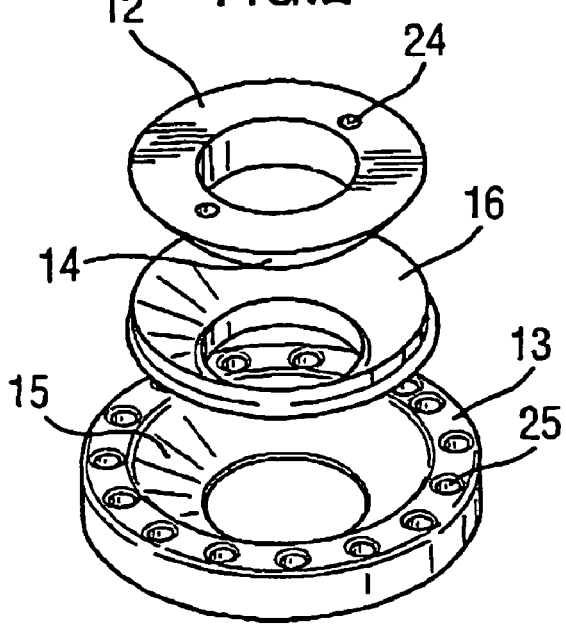
FIG. 2 is an exploded diagrammatic view of a "half" link of FIG. 1.

Assembled as shown in FIG. 1, the inner disc 12 and the outer disc 13 are separated by a layer of rubber 16 which may be formed in situ. Rubber layer 16 may be comprised of one or more layers of various types of elastomeric materials. Rubber layer 16 may also have disposed within it an interleaved rigid layer, formed of thin metal, resin, glass fiber, or the like, as seen in FIG. 3A. The rubber layer 16 is bonded to each of the outer disc 13 and the inner disc 12 to allow relative movement therebetween. Each inner disc is provided with a central bore indicated generally at 17 to define a central lumen through the centre of the device to accommodate a power supply and control mechanism for a work head at an extremity of the arm. Each link 11 may be formed from a pair of "link halves" which are best indicated in FIG. 2. Each link half comprises an outer link member 13, an inner link member 12 and a rubber disc or shell 16 adapted to be inserted between the two. The components may be bonded together to form a half link portion, which may then be joined together with adjacent components to form the continuous segment of links. It will be noted that the concave surface 21 of outer link element 13 is adapted to cooperate with the corresponding under surface (as shown in FIG. 2) of element 12. The disc 16 is shaped to be accommodated between the two and the components may be bonded together. This can be best seen from FIG. 3A which shows a section through the bonded components.

In one aspect of the invention, the outer disc and wire guide 13 is provided with a plurality of circumferentially spaced dowel holes 23 while the inner disc 12 is also provided with correspondingly spaced diametric dowel holes 24. When then assemblies are placed together with dowel pins located in holes 23 and 24 respectively, it will be appreciated by the person skilled in the art that if the assembly is then maintained under tension by the control wires therefore, permanent fixing will not be necessary. The outer disc 13 is provided with a plurality of through bores 25 adapted to constitute wire guide holes to accommodate the control wires for the device, wherein set opening extend through the central bore.

Figure 4:
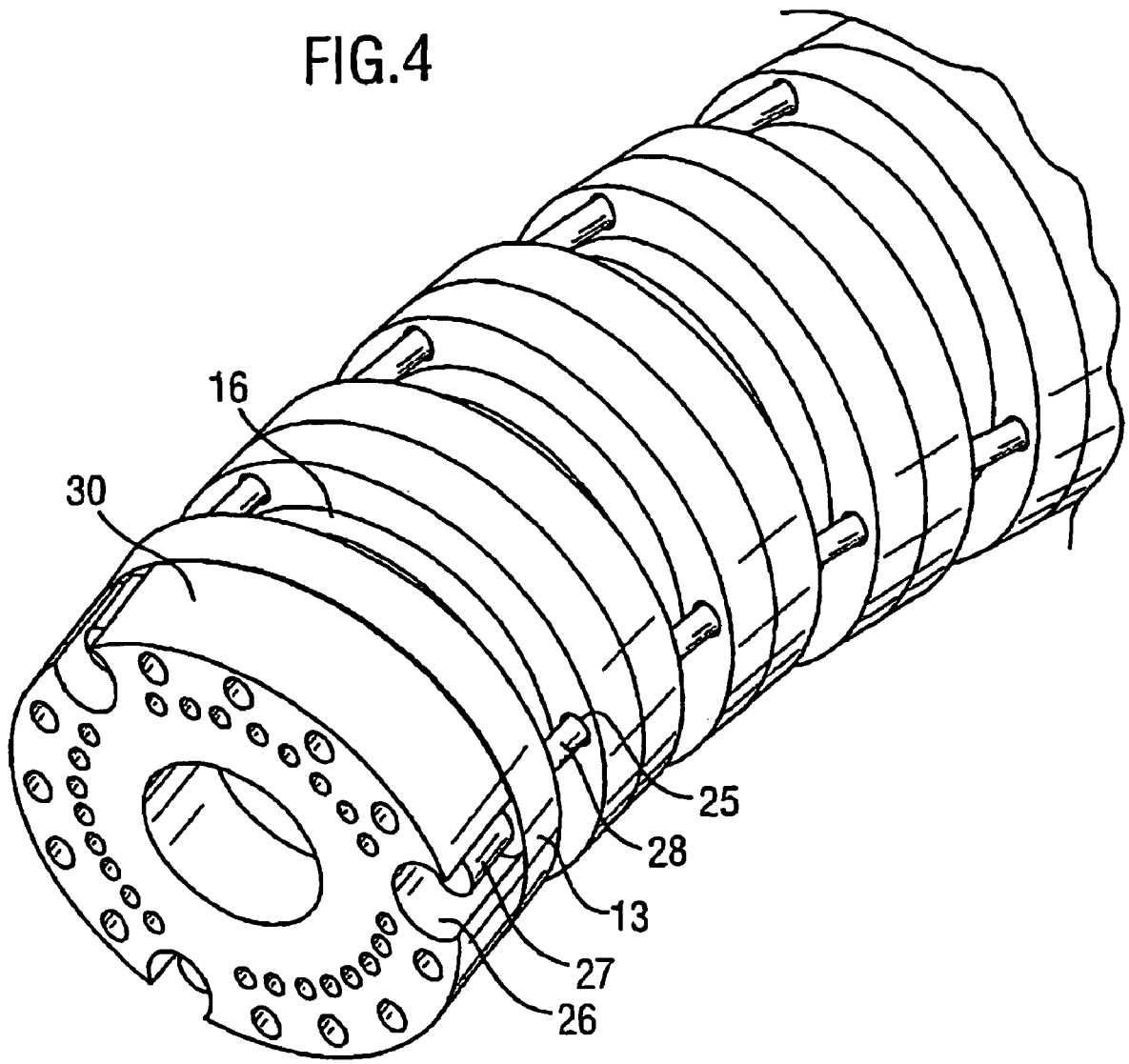
FIG. 4 is a perspective view of an end cap showing the ferrule attachment assembly at a remote end of a segment.

Each segment may be provided with an end cap 30 (see FIG. 4) which is provided with peripheral spaced wire accommodating holes and with an enlarged recess 26 including an anchorage means 27 affixed to the end of a control wire 28. Said anchorage means 27 could comprise, for example, a ferrule or cap. In assembling the device, the end cap 30 is secured to the adjacent outer disc portion 13 of the end link and the control wires 28 are threaded through the appropriate wire conduit means 26 in the end cap 30 and then through mating holes 25 in each of outer disc portions 13 for each link in the segment.

Several segments are then joined end to end to produce an arm of the appropriate length for the intended purpose. This "snake-like" arm has the ability to be manipulated to flow axially along its length and to follow a convoluted path in the manner of a snake.

The ends of the wires are passed back to actuators and are tensioned until the ferrule 27 is brought against the back plate to maintain the assembly under tension. By tensioning the assembly in this way, it is possible to avoid the bonding of the components shown in FIGS. 5, 6 and 7, the mating faces of the inner and outer discs may be appropriately grooved to accommodate a correspondingly profile rubber disc 16. Rubber disc 16 may be comprised of one or more layers of various types of elastomeric materials. Rubber disc 16 may also have disposed within it an interleaved rigid layer, formed of thin metal, resin glass fiber, or the like, as seen in FIG. 5. These grooves or profiling serves to key the disc 16 in position between the inner and outer discs 12 and 13 respectively and yet allows for movement of one with respect to the other in response to changes in tension in the control wires 28. This avoids the need for bonding of the discs and allows for relatively easy replacement of damaged components within any given segment.

In the assembled segment, the outer surfaces of the discs and the control wires may be sealed and the resultant cavity and wire guides filled with a lubricant so that the control wires run in a lubricated environment. This again, serves to reduce loss and friction in service.

Figure 8:
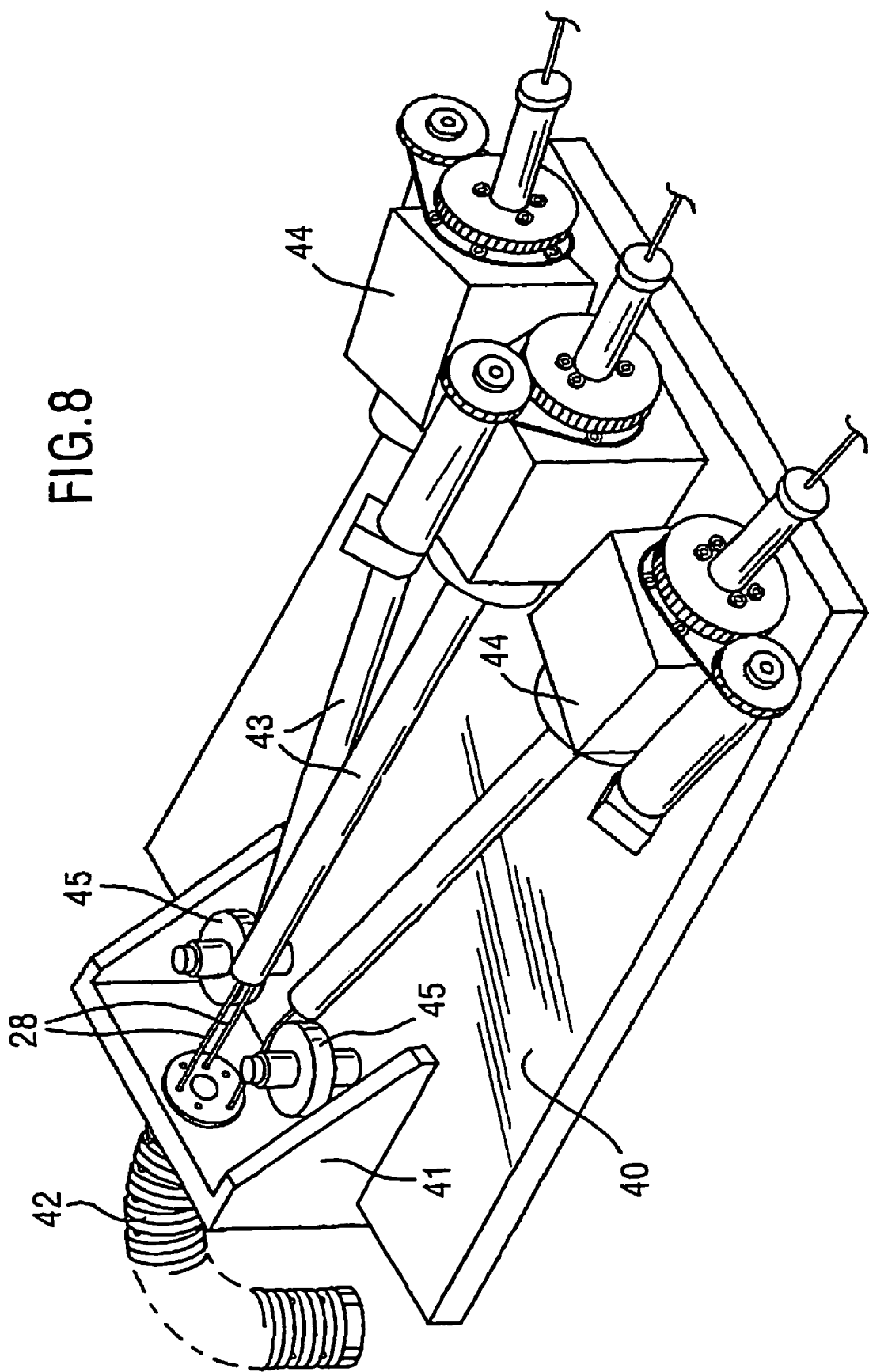
FIG. 8 is a headboard showing a three-actuator arrangement for a single segment.

Adjusting the tension on each of the wires may control the operation of each segment. FIG. 8 shows a simplified three-actuator control board that comprises a base member 40 having towards one end thereof an upstanding mounting plate assembly 41 adapted to mount an end plate of a segment 42. Control wires 28 extend through the mounting plate assembly 41 to the operating tubes 43 of each of actuators 44. The centre actuator 44 provides a direct feed for wires 28 from the segment to the actuator per se while those on either side of the centre operate via means of pulleys 45 to minimise any friction or wear in operation.

Each of actuators 44 may be controlled either manually or by computer to vary the tension in the three wires 28. Depending on the variants in the tension the individual links will seek to move in response to the changing tension in the wires thereby producing movement in the segments to permit guidance of the segment end to a given location in the work place.

Figure 9:
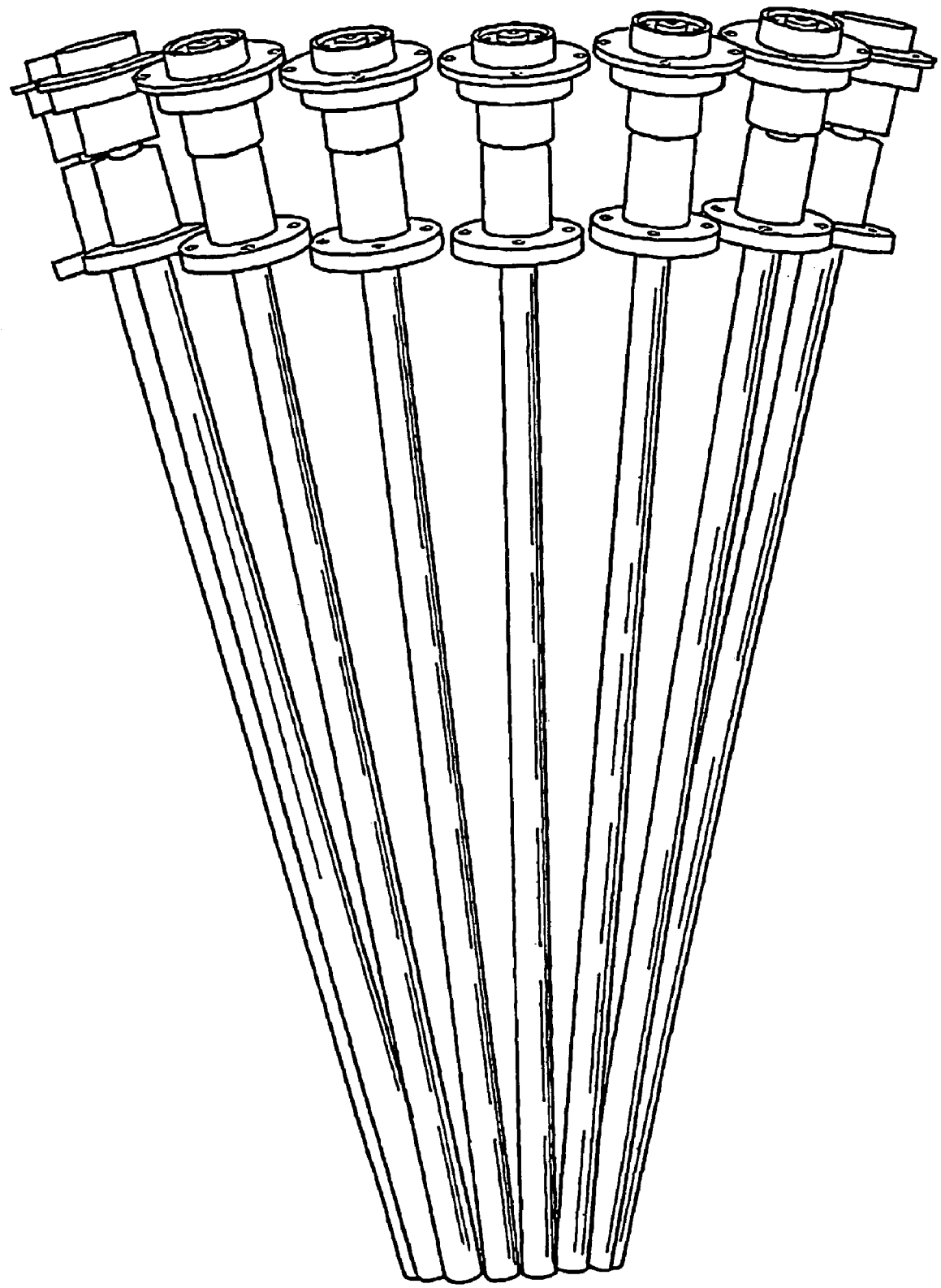
FIG. 9 is a frustocone arrangement for a plurality of actuators for controlling control wires for a robotic arm having a plurality of segments.

For multiple segments in an extended "snake" arm, of course, many more actuators will be required, usually three per segment. In these circumstances, it is necessary to structure the actuators to provide access to the control wires at their exit from the end of the first segment in a relatively small space. Accordingly, the actuators may be arranged in an arc so that the control wires or conduits containing them for each actuator define a cone rather as shown in FIG. 9.

The rubber discs 16 may be a single piece of rubber or may be in the form of a composite rigid layer elastomer and the present applicants have found that the thinner the individual layers of rubber, the more efficient is the eventual layer and the stiffer the joint between the inner disc and the corresponding outer disc.

Figure 10:
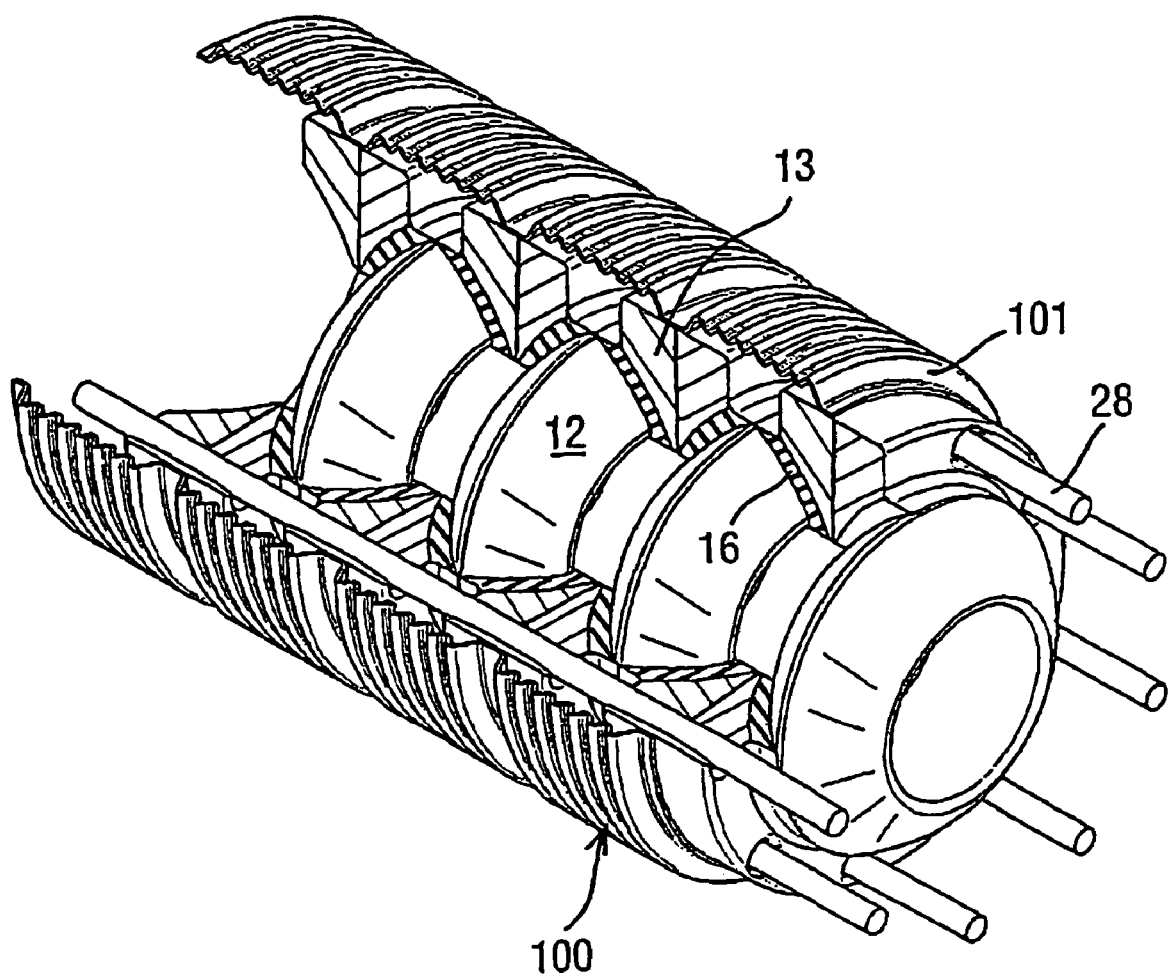
FIG. 10 is a perspective view of sheathed segment for an arm in accordance with the present invention.

The apparatus in accordance with the present invention also provides a sealing of the bearing surfaces between the inner and outer discs and prevents the ingress of injurious matter from the atmosphere (see FIG. 10). Furthermore, the central bore or lumen 17 is effectively sealed and provides ready access for power supply and control means for a work head at the end of the robotic arm.

The sealing may be affected by sheathing 100, which is provided with circumferential corrugations 101. This sheathing 100 extends externally of the outer surface of each of the outer discs and wire guides 13. The sheathing 100 seals the interstices between each of the outer discs and wire guides 13, and the sheath is filled with oil or other lubricant thereby permitting the control wires to operate in a lubricant environment. Suitable lubricants are oils, powders and greases the viscosity and other physical characteristics of which will be selected according to the environment in which the arm is to be employed.

The use of a sheath 100 having a bellows-type structure has the effect of increasing the torsional and/or bending stiffness of the links one to another. This can result in a significant increase in the torsional stiffness of the arm with very little increase in bending stiffness. The arrangement serves to protect the wires and other components from external causes of damage.

The containment of lubricant by the sheath 100 has a major advantage in operation. As described above, as the segment bends, adjacent peripheries of the outer discs and wire guides 13 move closer together whereas the diametrically opposite portions of the same discs 13 move apart. As a result, the cavity containing the lubricant changes shape from a toroidal cavity of generally continuous and substantially uniform cross-section to a "wedge"-shape. This causes lubricant from the inside or "narrow" side of the wedge to be displaced and effectively pumped to the "wide" side of the wedge on the outer part of the curve. In doing so, the lubricant passes by and over the various wires. Each time the segment flexes, therefore, or each time the plane of curvature changes, this pumping effect serves to provide positive lubrication of the components within the arm and in particular of each wire.

It will be appreciated that the lubricant can be introduced into the arm in a number of different ways. In one embodiment of the invention, the cavities may be filled with lubricant on assembly and be effectively sealed for life. In an alternative embodiment of the invention, individual links or segments of the arm may be isolated and the lubricant introduced through access points such, for example, as grease nipples with excess lubricant being released through an additional port or pressure release valve. In a further aspect of the invention, the whole arm may be lubricated as a unitary whole using the wire holes in the outer links to pass lubricant along the entire length of the arm. Liquid lubricant may be pumped continuously through the arm and recycled back to a central reservoir. Such an arrangement will allow for temperature control of the lubricant in the arm by either heating or cooling the lubricant and the present invention includes the provision of temperature control means for liquid lubricant within the arm.

What is claimed is:

1. A link assembly for a robot arm which assembly comprises:
    a first set of first and second link members each adapted for limited movement one with respect to the other, said first link member having a first set opening extending therethrough;
    a resilient elastomer disposed between said first set of first and second members;
    a second set of third and fourth link members each adapted for limited movement one with respect to the other, said fourth link member having a second set opening extending therethrough;
    a resilient elastomer disposed between said second set of third and fourth members, where the second link member abuts the third link member;
    a third set of link members including a fifth and a sixth link member, each adapted for limited movement one with respect to the other, said fifth link member having a third set opening extending therethrough, wherein said third set opening comprises a flared opening;
    a resilient elastomer disposed between said third set of fifth and sixth link members, wherein said fifth link member abuts said fourth link member such that said second set opening abuts said third set opening;

at least one wire extending through said first set opening in said first set of link members and through said second set opening in said second set of link members controlling the movement of said first and second set of link members, wherein said first set opening and said second set opening comprise flared openings;

said at least one wire including a preload so as to maintain said link assembly under compression;

characterized in that the first and second link members are configured in a cooperating mating relationship and the elastomer is disposed between them as a layer and the elastomer is keyed or bonded to both of the first and second link members whereby the layer is maintained under compression by said at least one wire such that a bending movement between the members produces shear movement within the elastomer and substantially no compressive movement as a result of the relative movement between the said first and said second members.

2. A link assembly as claimed in claim 1 wherein the elastomer is a natural or synthetic rubber.

3. A link assembly as claimed in claim 1 wherein the thickness of the layer is 3 mm or less.

4. A link assembly as claimed in claim 1 wherein each surface of the elastomeric layer contiguous the member is secured so that in operation, relative movement between the members produces shear movement within the elastomer, the arrangement being such that the thinness of the layer reduces the tendency towards compression thereby imparting improved stability for the positioning of the components.

5. A link assembly as claimed in claim 1 wherein the elastomer means comprises a plurality of layers of elastomer.

6. A link assembly as claimed in claim 5 wherein an interleaving rigid layer is bonded or keyed to adjacent elastomer layers to separate one layer from its neighbor.

7. A link assembly as claimed in claim 6 wherein the interleaving layer between each layer of elastomer is of a material, which is bondable to or capable of being keyed to the elastomer.

8. An assembly as claimed in claim 6 wherein the interleaving layer comprises a metal layer, a resin or glass fiber, or a mat of either woven or unwoven material.

9. An assembly as claimed in claim 8 wherein the woven or unwoven material comprises carbon fiber or Kevlar.

10. A link assembly as claimed in claim 1 wherein the elastomer means is a laminate.

11. A robotic arm comprising a segment having a plurality of link assemblies as claimed in claim 1 and said at least one wire comprises control means for controlling the movement of said link assemblies within the segment.

12. A robotic arm as claimed in claim 11 wherein the control means comprises three wires each extending from one end of the segment to the other whereby changing the tension in the wires one relative to the other causes or allows the links to flex thereby controlling movement of the segment.

13. A robotic arm as claimed in claim 12 wherein the wires are tensioned to maintain the links under compression, the arrangement being such that application of differential tension between the wires causes or allows the segment to move or bend.

14. A robotic arm as claimed in claim 11 wherein, in each link assembly, the first link member comprises an outer disc having holes for control wires so that the control wires extend externally of the other components of the link assembly, and the second link member comprises an inner disc which is adapted to be disposed generally inwardly of the outer disc and which has a central bore to accommodate at least one of control and power means for the work head and a rubber disc or layer extending between each inner and outer disc which is bonded or keyed to each, but which is otherwise free-floating between said inner disc and outer disc so that the inner disc is not directly constrained by other components of the assembly.

15. A robotic arm as claimed in claim 11 comprising a plurality of said segments in which control means is provided for each segment.

16. A robotic arm as claimed in claim 15 wherein each segment terminates in an end cap having wire conduit means for the control wires of other segments of the arm and anchorage means arcuately spaced about the cap for securing the control wires for the segment in question.

17. A robotic arm as claimed in claim 15 characterized in that each control wire is operated by an actuator and wherein the actuators associated with each control wire are spaced in one or more arcs about a headboard contiguous one end of the first segment.

18. A robotic arm as claimed in claim 17 wherein the actuator array provides one actuator for each wire to be disposed in a spaced arcuate relationship to define a frustocone, further characterized in that the wire from at least one actuator is passed about a guide or pulley to provide a fair lead for the control wire from the actuator to the entry into the segment.

19. A robotic arm as claimed in claim 11 wherein at least one of the members of each link is provided with means for guiding the wires from one end of the segment to the other.

20. A robotic arm as claimed in claim 11 wherein each wire is disposed externally of the segment links and terminates in a ferrule which is adapted to engage with a corresponding recess in the end cap of a segment so that on tensioning the wires, the ferrule is brought into engagement with the end cap to exert a compressive load on each of the links to maintain the stiffness of the links within the segment.

21. An arm as claimed in claim 11 characterized by an external sleeve provided about each segment.

22. An arm as claimed in claim 21 wherein the sleeve is a bellows-type sheath.

23. An arm as claimed in claim 21 wherein the sleeve comprises a material and a configuration which are selected to increase the tortional stiffness of the arm.

24. An arm as claimed in claim 21 wherein the sheathed segment is filled with a lubricant.

25. An arm as claimed in claim 24 wherein the lubricant is either a dry powder or a liquid such as grease and/or oil and wherein the physical characteristics of the lubricant incorporated in the arm are selected according to the environment in which the arm is to operate.

26. An assembly as claimed in claim 1 wherein each link is produced as a pair of half links which permit back to back assembly, the arrangement being such that an inner link and an outer link halves may be assembled with its associated bonding layer to form unitary link components, a plurality of which together can be assembled to form a segment.

27. An assembly or arm as claimed in claim 26 wherein each of the half links can be located by means of locating dowels provided in mating holes on each of the assembled half-links whereby the assembly can be produced without further connection between the half-linked components and cables can be threaded through the various operating holes in the outer link periphery coupled to the actuator board, the arrangement being such that the actuators can be activated to produce a degree of tension in the board and in the cables whereby the whole assembly is held together so that by varying the tension in the wires, the segment can be manipulated as appropriate.

28. An arm as claimed in claim 1 wherein said second set opening is flared such that an inner diameter of said second set opening is larger at an end extending away from said fifth member.

29. An arm as claimed in claim 28 wherein said third set opening is flared such that an inner diameter of said third set opening is larger at an end extending away from said fourth member.

30. An arm as claimed in claim 1 wherein said flared first set opening and said flared second set opening are provided with a diameter such that said wire extends through said openings.

31. An arm as claimed in claim 1 wherein said first and second link members and said third and fourth link members include a central bore extending therethrough.

32. A link assembly for a robot arm which assembly comprises:
- a first set of link members including:
- a first member having a first set opening extending therethrough;
- a second member adjacent to said first member, said second member comprising an elastomer;
- a third member adjacent to said second member;
- said first and said third members adapted for movement with respect to each other;
- a second set of link members including:
- a fourth member, wherein said fourth member abuts said third member;
- a fifth member adjacent to said fourth member, said fifth member comprising an elastomer;
- a sixth member adjacent to said fifth member having a second set opening extending therethrough;
- said fourth and said sixth members adapted for movement with respect to each other;
- said first set of link members positioned adjacent to said second set of link members, wherein said first set opening and said second set opening comprise flared openings;
- a third set of link members including:
- a seventh member having an third set opening extending therethrough;
- an eighth member adjacent to said seventh member, said eighth member comprising an elastomer;
- a ninth member adjacent to said eighth member;
- said seventh and said ninth members adapted for movement with respect to each other, wherein said seventh member abuts said sixth member such that said second set opening abuts said third set opening;
- at least one wire extending from said first member to said sixth member controlling the movement of said first and second set of link members, said at least one wire including a preload so as to maintain said link assembly under compression;
- wherein the first and third members are configured in a cooperating mating relationship and the second member is disposed between them as a layer maintained under compression by said at least one wire such that a bending movement between the first and third members produces shear movement within the second member and substantially no compressive movement as a result of the relative movement between the first and third members; and
- wherein the fourth and sixth members are configured in a cooperating mating relationship and the fifth member is disposed between them as a layer maintained under compression by said at least one wire such that a bending movement between the fourth and sixth members produces shear movement within the fifth member and substantially no compressive movement as a result of the relative movement between the fourth and sixth members.

33. An arm as claimed in claim 32 wherein said second set opening is flared such that an inner diameter of said second set opening is larger at an end extending away from said seventh member.

34. An arm as claimed in claim 33 wherein said third set opening is flared such that an inner diameter of said third set opening is larger at an end extending away from said sixth member.

35. An arm as claimed in claim 32 wherein said flared first set opening and said flared second set opening are provided with a diameter such that said wire extends through said openings.

36. An arm as claimed in claim 32 wherein said first and third members and said fourth and sixth members include a central bore extending therethrough.

* * * * *